R. F. DANIELS.
MACHINE FOR MAKING NETS.
APPLICATION FILED AUG. 11, 1906.
979,828.
Patented Dec. 27, 1910.
12 SHEETS—SHEET 1.
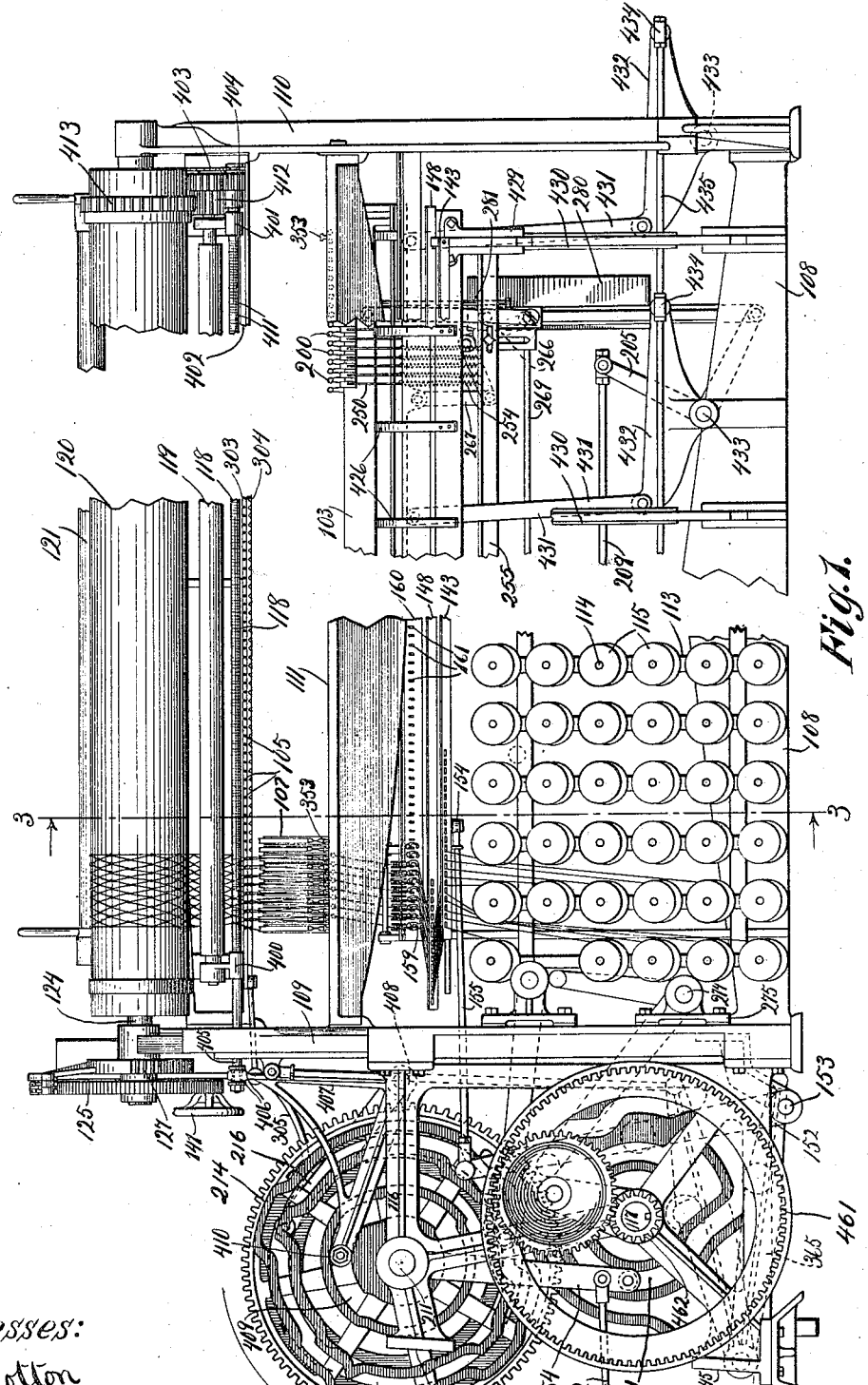
Fig. 1.
Witnesses:
W. H. Cotton
Charles B. Gillson
Inventor:
Richard F. Daniels

R. F. DANIELS.
MACHINE FOR MAKING NETS.
APPLICATION FILED AUG. 11, 1906.

979,828.

Patented Dec. 27, 1910.
12 SHEETS—SHEET 4.

Witnesses:
W. H. Cotton
Charles B. Gillson.

Inventor:
Richard F. Daniels
By Louis K. Gillson Atty.

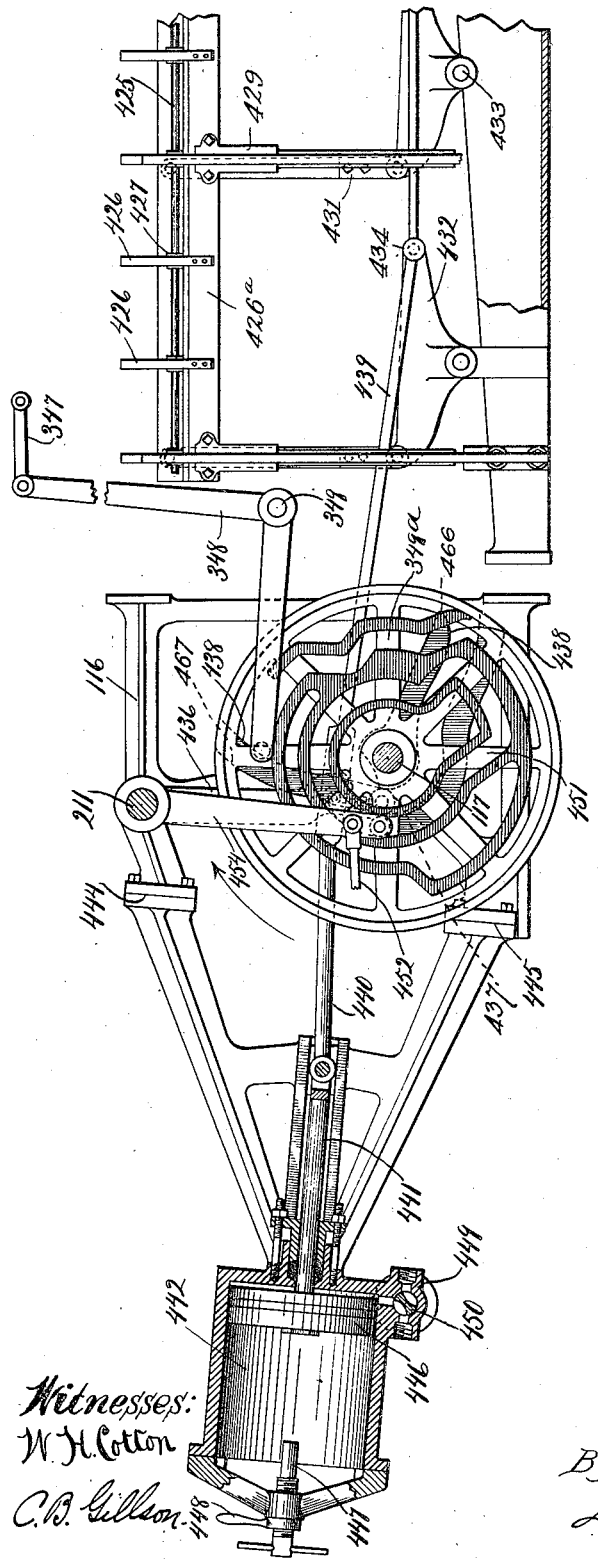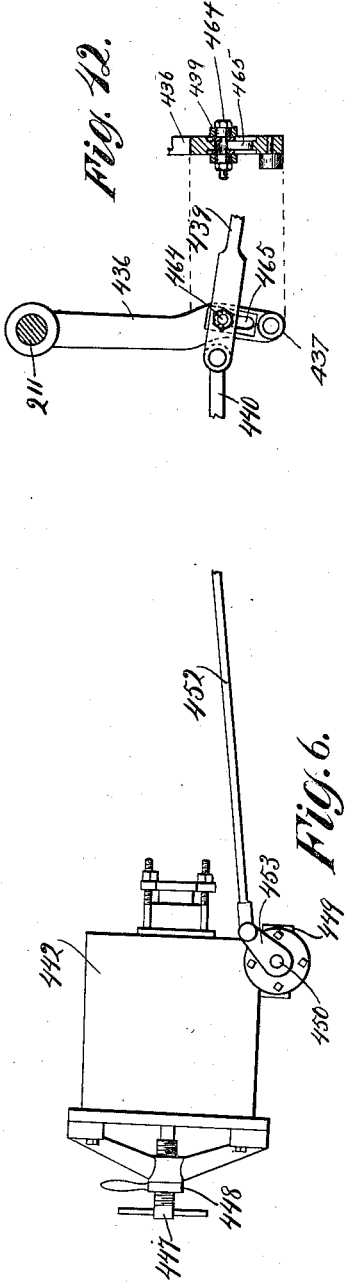

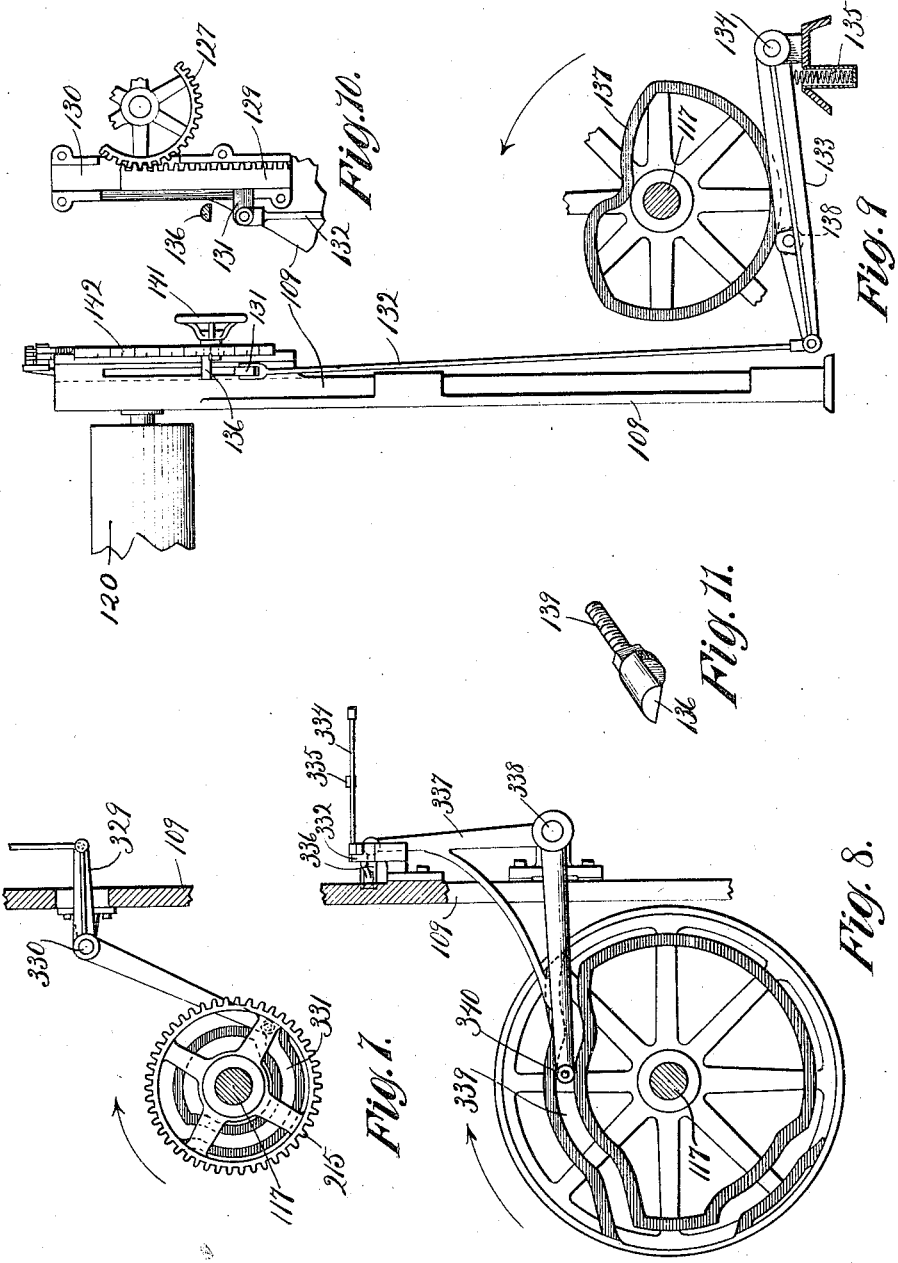

R. F. DANIELS.
MACHINE FOR MAKING NETS.
APPLICATION FILED AUG. 11, 1906.
979,828.
Patented Dec. 27, 1910.
12 SHEETS—SHEET 7.
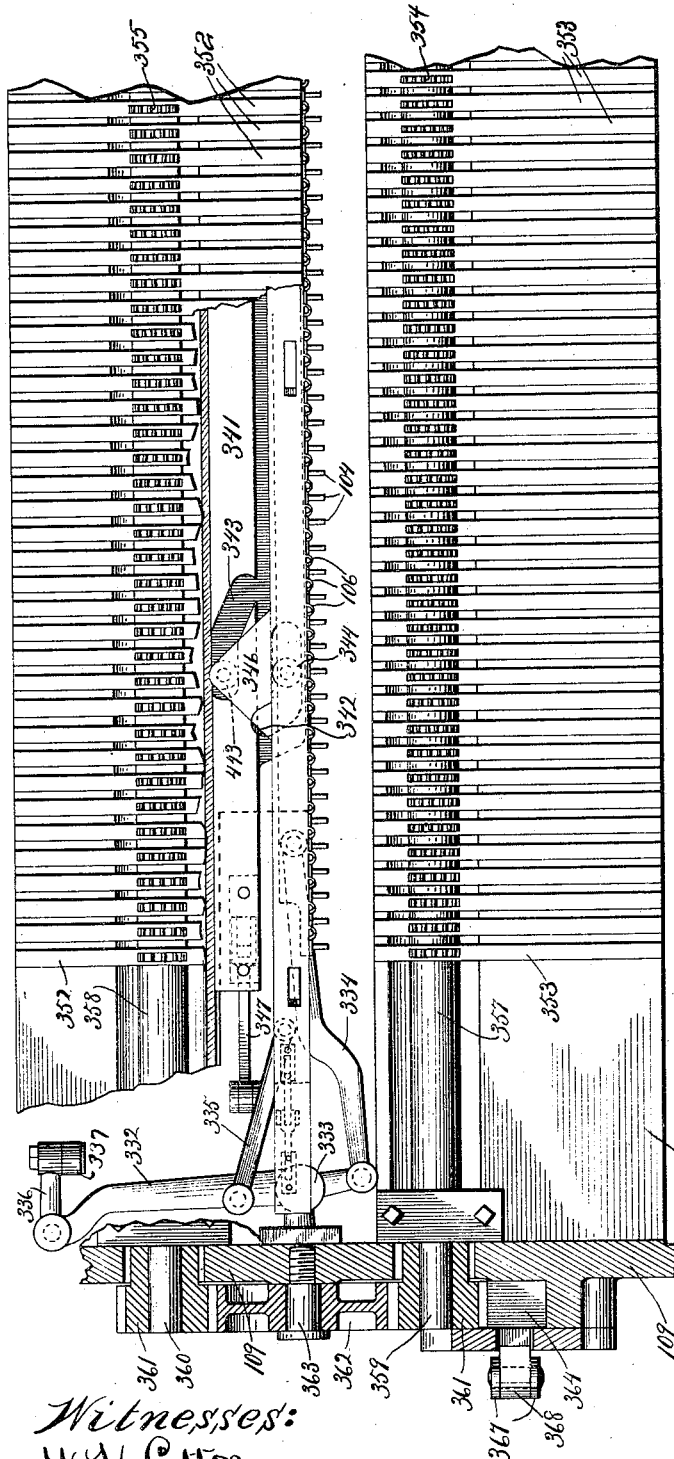
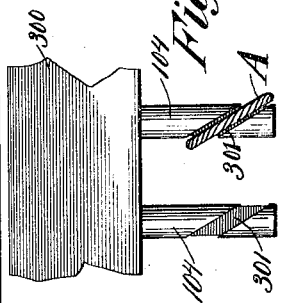
Witnesses:
W. H. Cotton
Charles B. Gillson.
Inventor:
Richard F. Daniels
By Louis K. Gibson
Atty.

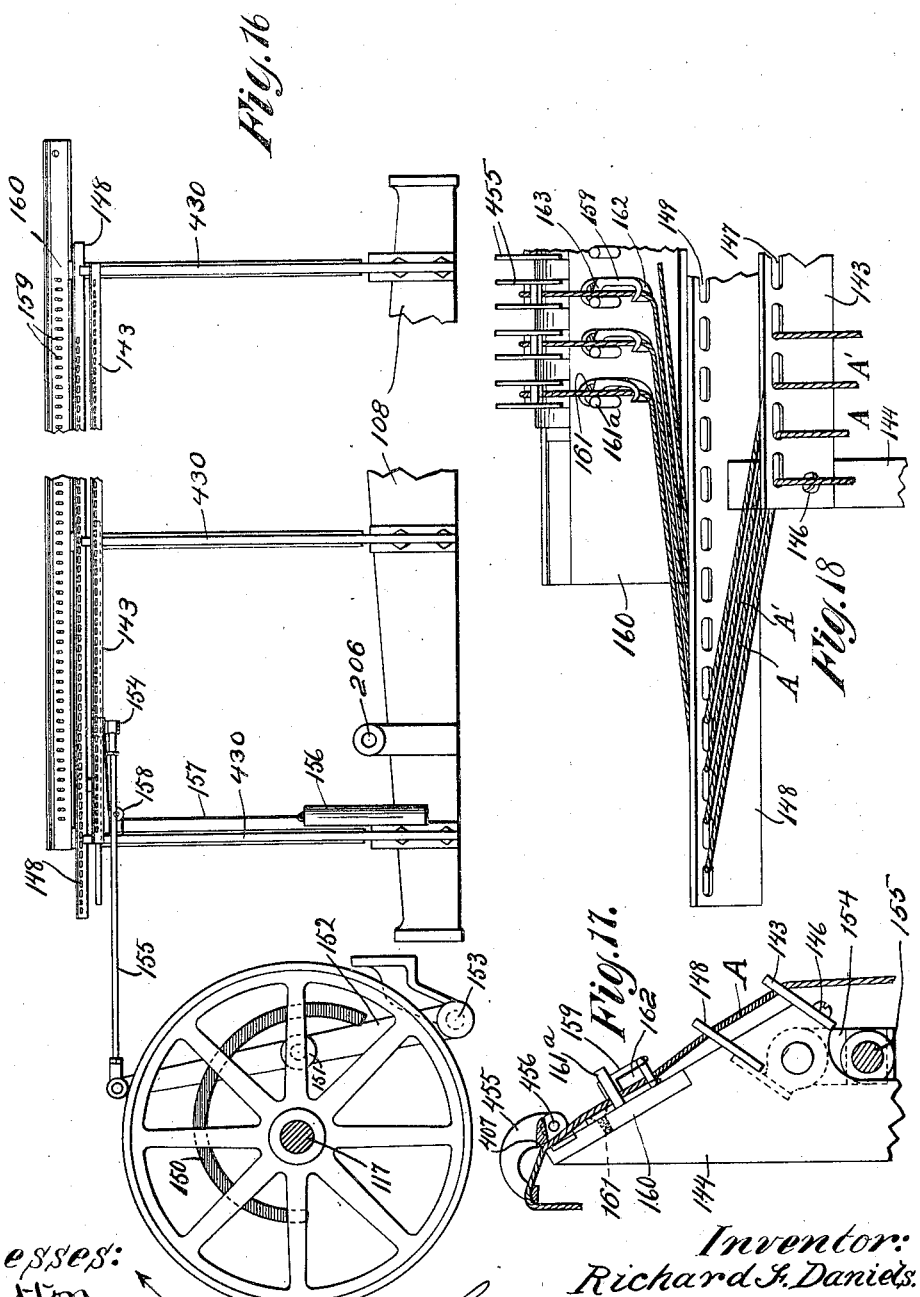

R. F. DANIELS.
MACHINE FOR MAKING NETS.
APPLICATION FILED AUG. 11, 1906.

979,828.

Patented Dec. 27, 1910.
12 SHEETS—SHEET 9.

Witnesses:
W. H. Cotton
Charles B. Gillson.

Inventor:
Richard F. Daniels.
By Louis K. Gibson
Atty.

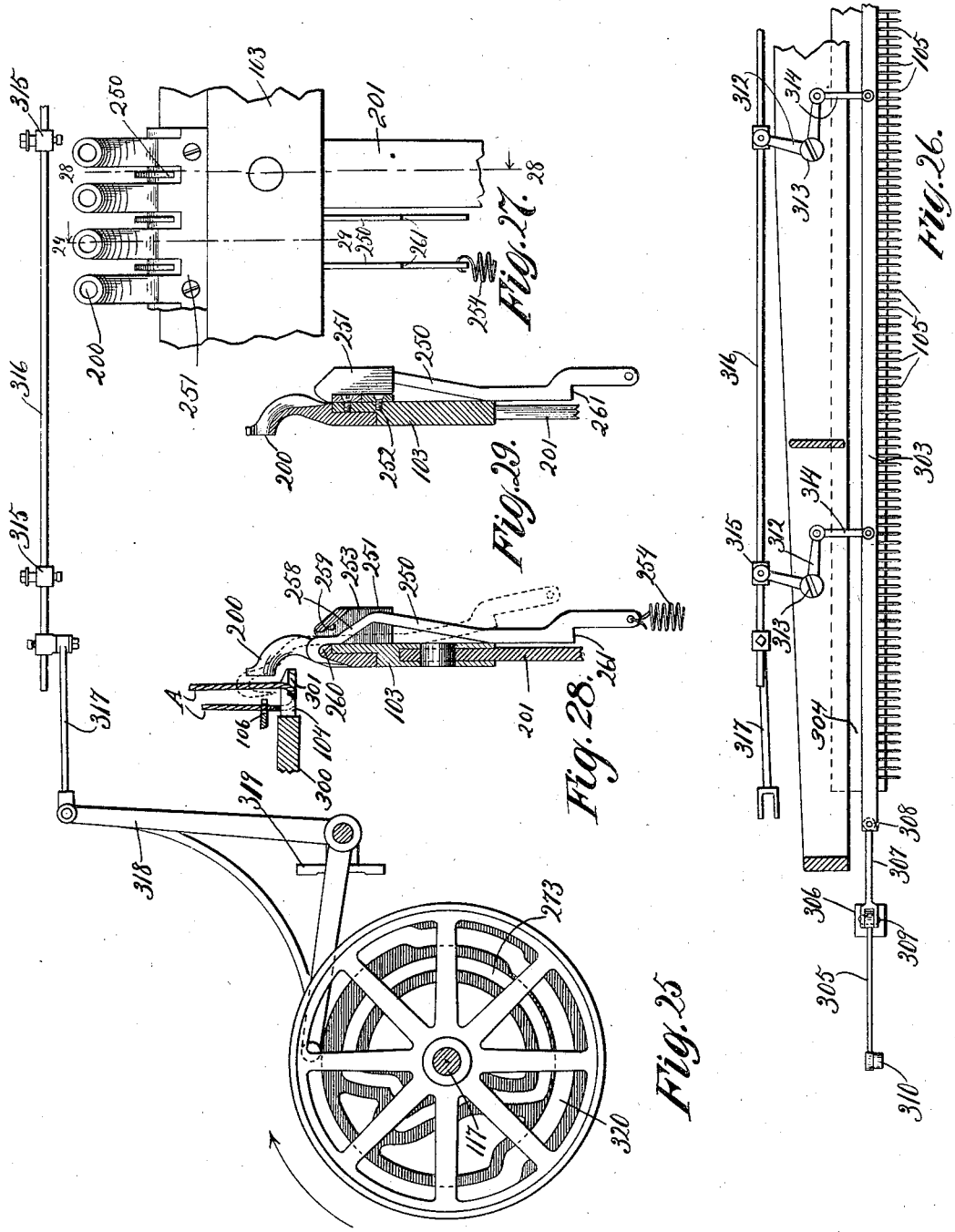

R. F. DANIELS.
MACHINE FOR MAKING NETS.
APPLICATION FILED AUG. 11, 1906.
979,828.
Patented Dec. 27, 1910.
12 SHEETS—SHEET 11.
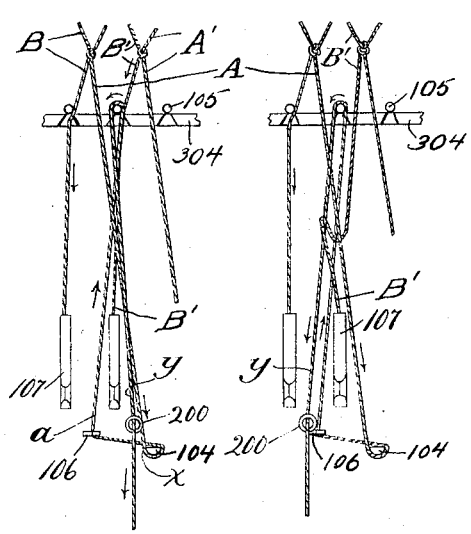
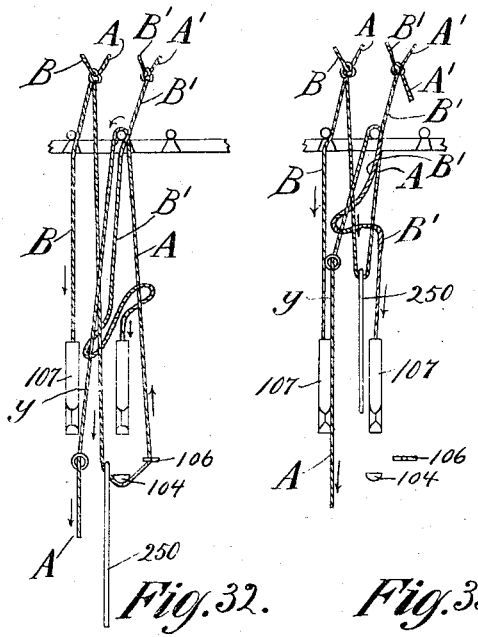
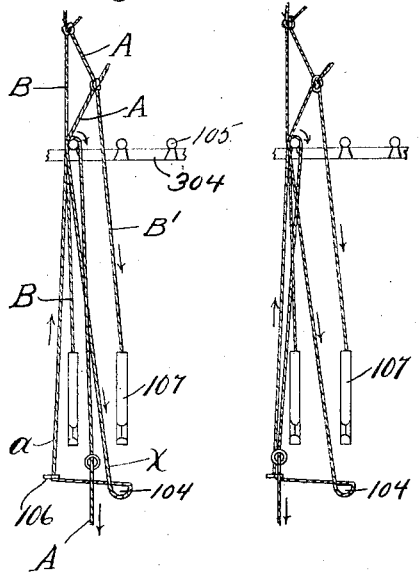
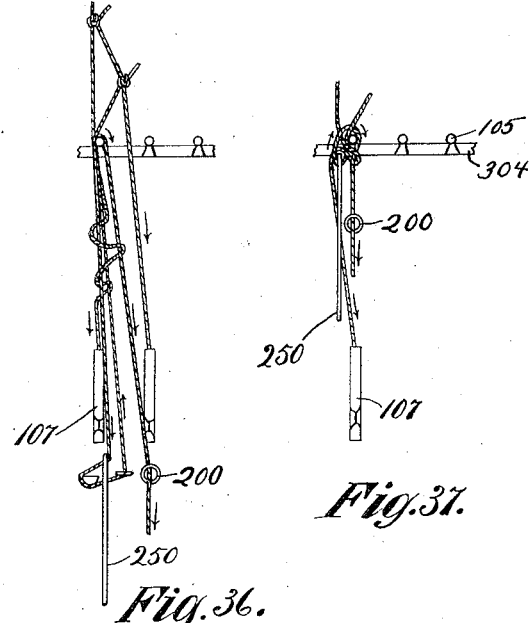
Fig. 30.  Fig. 31.  Fig. 32.  Fig. 33.
Fig. 34.  Fig. 35.  Fig. 36.  Fig. 37.
Witnesses:
W. H. Cotton
Charles B. Gillson.
Inventor:
Richard F. Daniels.
By Louis K. Gibson
Atty.

R. F. DANIELS.
MACHINE FOR MAKING NETS.
APPLICATION FILED AUG. 11, 1906.

979,828.

Patented Dec. 27, 1910.
12 SHEETS—SHEET 12.

Witnesses:
W. H. Cotton
Charles B. Gillson

Inventor.
Richard F. Daniels.
By
Louis K. Gillson
Atty.

UNITED STATES PATENT OFFICE.

RICHARD F. DANIELS, OF CHICAGO, ILLINOIS.

MACHINE FOR MAKING NETS.

979,828.        Specification of Letters Patent.     Patented Dec. 27, 1910.

Application filed August 11, 1906. Serial No. 330,130.

*To all whom it may concern:*

Be it known that I, RICHARD F. DANIELS, a citizen of the United States, and resident of Chicago, county of Cook, and State of Illinois, have invented certain new and useful Improvements in Machines for Making Nets, of which the following is a specification, and which are illustrated in the accompanying drawings, forming a part thereof.

The invention relates to machines for making nets, and particularly to those of that type in which a net is produced by the knotting together, usually with the so-called "weavers" knot, of a plurality of warp and weft threads.

The object of the invention is to provide a machine which shall be capable of producing nets, the meshes of which are not distorted by the twisting of the threads.

As it has been discovered that nets having tightly drawn "single weavers" knots are quite as durable as the more expensive nets having "double" knots, a feature of the invention provides for the application of great power to the tying of the knots.

Further features of the invention will be developed during the course of the following specification.

The invention is exemplified by the structure hereinafter described and illustrated in the accompanying drawings, in which—

Figure 2:
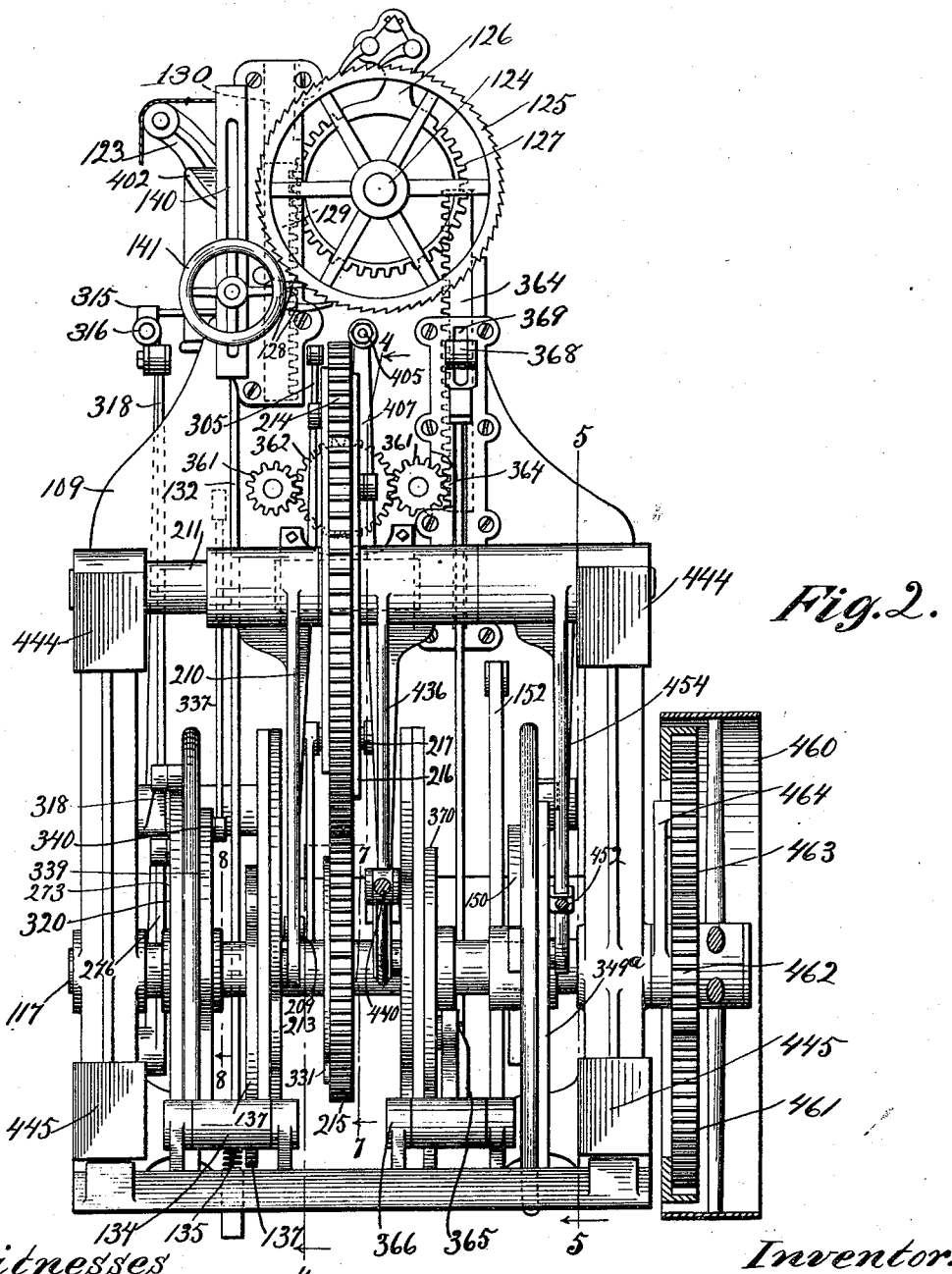
Figure 3:
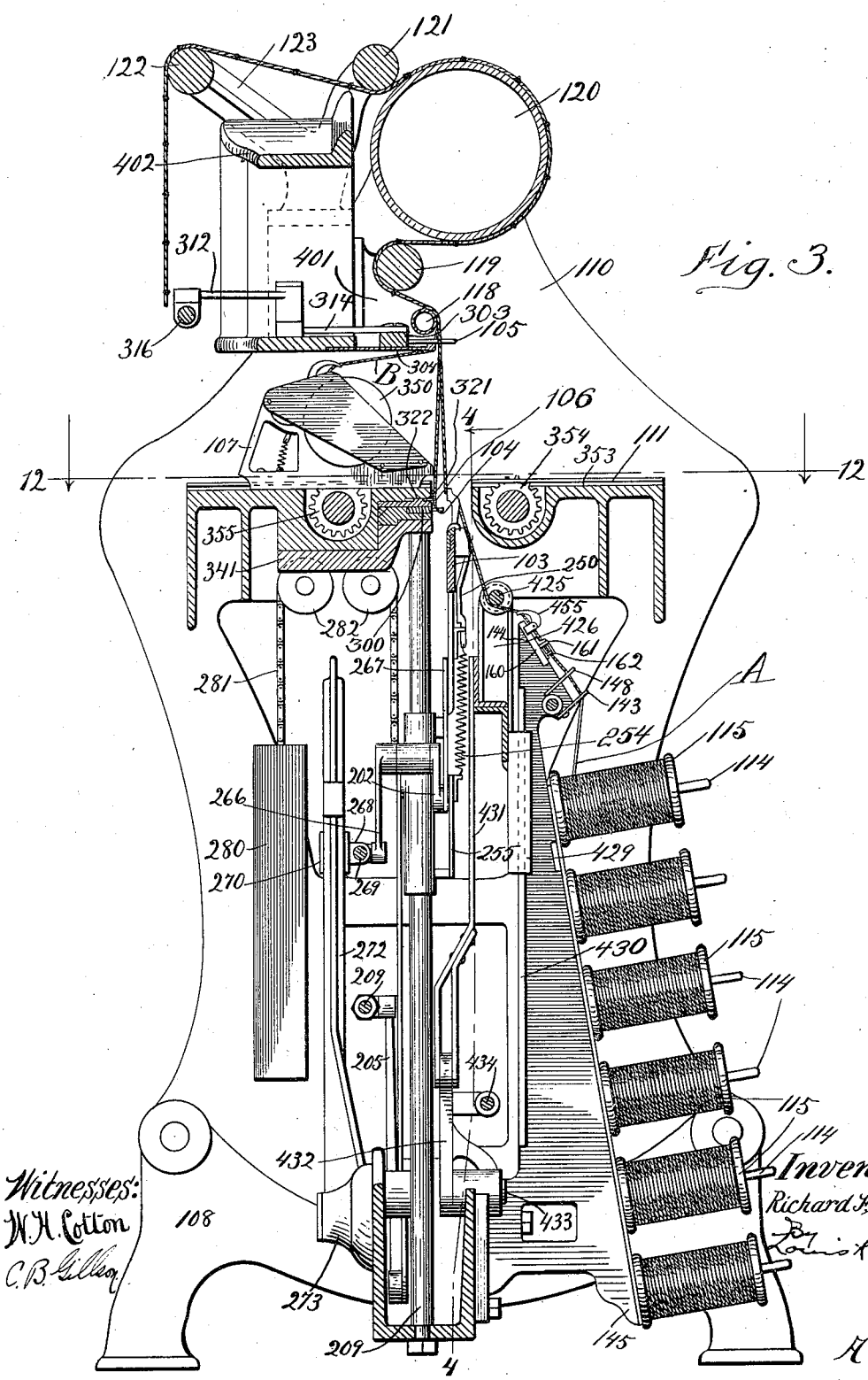
Figure 4:
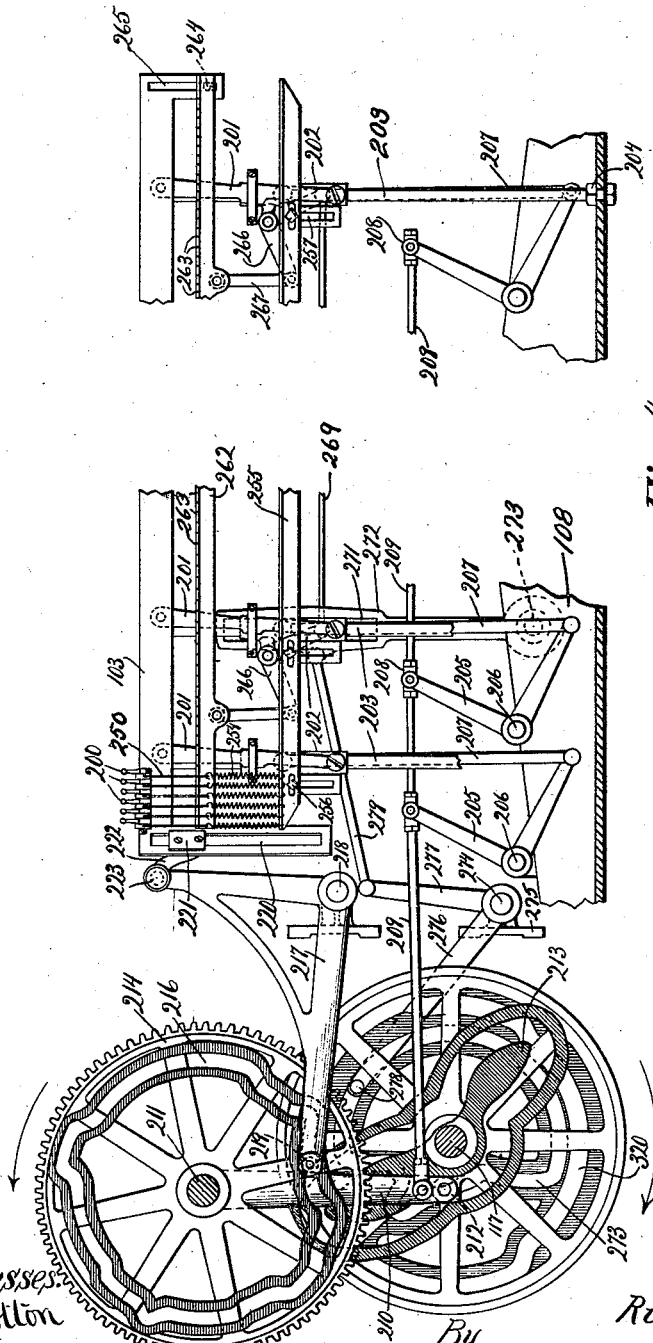
Figure 19:
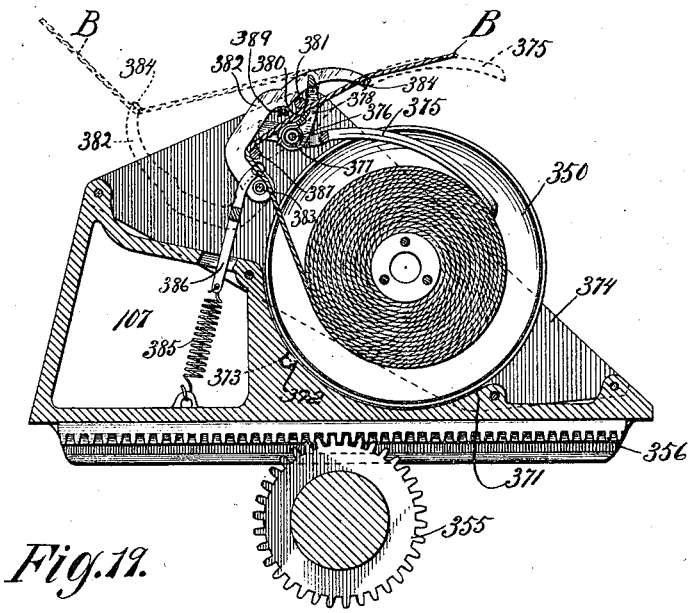
Figure 21:
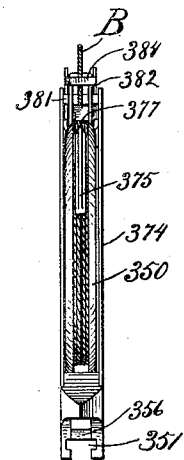
Figure 20:
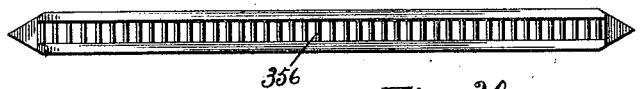
Figure 24:
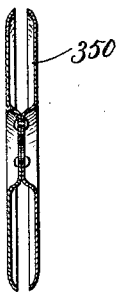
Figure 22:
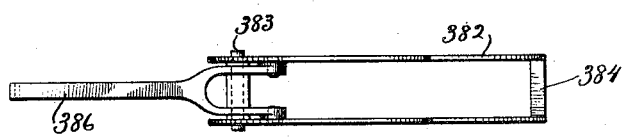
Figure 23:
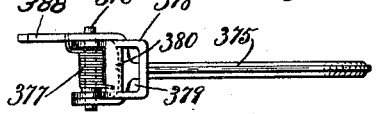
Figure 38:
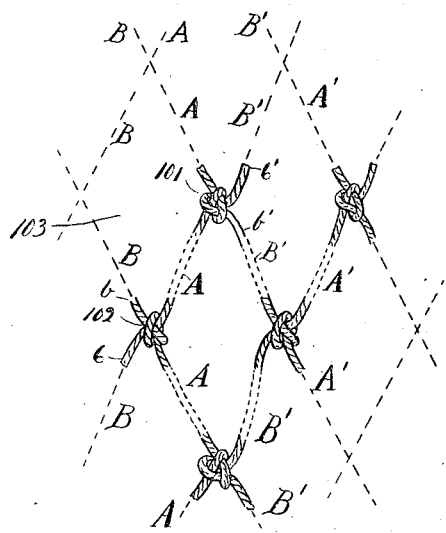
Figure 39:
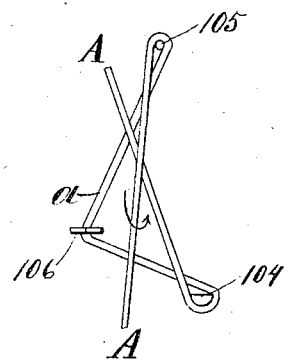
Figure 41:
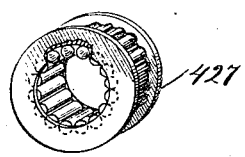
Figure 40:
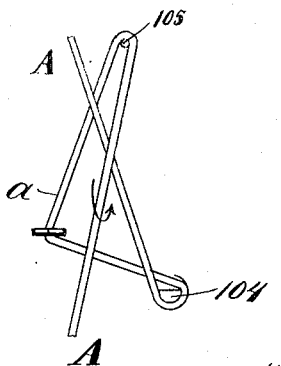

Figure 1 is a front elevation of a netting machine, constructed according to the invention, some of the parts being removed; Fig. 2 is an end elevation of the parts shown in Fig. 1; Fig. 3 is a vertical cross-section on the line 3—3, of Fig. 1; Fig. 4 is a vertical longitudinal section on the lines 4—4 of Figs. 2 and 3; Fig. 5 is a central vertical section of the machine, a part of the framework being omitted for the sake of illustration; Fig. 6 is a detail elevation of a power cylinder used on the machine; Figs. 7 and 8 are sectional details on the line 7—7 and 8—8, respectively, of Fig. 2; Fig. 9 is a detail rear elevation of the machine, some of the parts being shown in vertical longitudinal section; Fig. 10 is a detail end elevation of the machine, showing the parts illustrated in Fig. 9; Fig. 11 is a perspective view of a stop used on the machine; Fig. 12 is a plan sectional view of the machine on the line 12—12 of Fig. 3; Fig. 13 is a detail elevation of a part of the loop-forming mechanism of the machine; Fig. 14 is a bottom plan view of some of the parts shown in Fig. 12; Fig. 15 is a perspective view showing in detail the looping pin illustrated in Fig. 14, inverted; Fig. 16 is a detail longitudinal section of the machine, some of the parts being omitted; Fig. 17 is a detail end elevation of the parts shown in Fig. 16, some of them appearing in vertical cross-section; Fig. 18 is similar to Fig. 16, but drawn to a larger scale; Fig. 19 is a central vertical section of a shuttle used on the machine; Fig. 20 is a bottom plan view of the same; Fig. 21 is a front elevation of the same; Figs. 22, 23 and 24 show details of the shuttle mechanism; Fig. 25 is a detail longitudinal section of the machine, some of the parts being omitted; Fig. 26 is a detail plan section of the machine; Fig. 27 shows a detail of Fig. 4 drawn to a larger scale; Figs. 28 and 29 are detail cross-sections on the line 28—28 and 29—29, respectively, of Fig. 27; Figs. 30 to 37 inclusive illustrate the operation of the knot-forming mechanism used on the machine; Fig. 38 shows a detail of a fabric which may be produced upon the machine; Figs. 39 and 40 are diagrammatic illustrations of a method of forming knots upon the machine; Fig. 41 shows in perspective a journal-bearing used on the machine; and Fig. 42 is a detail elevation of some of the parts shown in Fig. 5.

A detail of netting, such as may be produced by the particular form of machine illustrated in the drawings, is shown in Fig. 38, and is composed of warp threads A, A′, and weft threads B, B′, knotted together, as indicated at 101 and 102, to form angular meshes 103. In order that these meshes may not be distorted by a twisting of the threads in their manufacture, adjacent knots upon each thread must be oppositely drawn, that is, as each weft thread is knotted alternately with each of two adjacent warp threads, the knots must be so produced that the ends b, b, of the weft thread B where it is knotted with the warp thread A, as indicated at 102, Fig. 38, must be directed toward the adjacent warp thread on the opposite side from that toward which the ends b′, b′, of the weft thread B′ at the next adjacent knot on the same warp thread A are directed. This effect is produced by forming a different form of loop in the warp thread for each alternate knot.

In Fig. 39, there is shown a loop, such as is produced for tying knots of the form designated 101 in Fig. 38, while in Fig. 40 is shown the form of loop produced for the oppositely drawn knots, as 102. The method of tying the two knots is illustrated more in detail in Figs. 30 to 37 inclusive, Figs. 30 to 33 showing the formation of a knot by means of the loop illustrated in Fig. 39, and Figs. 34 to 37 showing the formation of such a knot as is produced by means of the loop illustrated in Fig. 40.

In the preferred form of machine illustrated in the drawings, the loop shown in Fig. 39 is produced by guiding the warp thread A by means of a suitable thread-carrier 103, most clearly shown in Fig. 4, to the right beneath a looping pin 104, and then upwardly and to the left around a second looping pin or needle 105, the strand $a$ between the two looping pins being in the meantime drawn backwardly and to the left by a catch or hook 106, and there is preferably also a movement of the pin 104 to the right to further open out the loop. The weft thread, as B', is then passed back and forth through the loop, as indicated by the arrow, Fig. 39, by means of a shuttle 107, producing a knot which, when drawn tight, is of the form shown at 101, Fig. 38. In producing the form of knots designated 102, Fig. 38, the same cycle of operations is followed, except that the warp thread is passed around the upper looping-pin or needle 105 to the right, as shown in Fig. 40, and in Figs. 34 to 37, inclusive.

The machine illustrated in the drawings is adapted to operate simultaneously upon a considerable number of warp threads A, A', and has a less number by one of shuttles 107, the warp thread at each end of the machine being knotted with a weft thread only during the production of each alternate row of knots, thus forming a selvage edge at each side of the fabric produced. There is provided a bed, generally designated 108, and having uprights 109, 110, a horizontally-disposed connecting member or table 111, which, as shown, is provided with a longitudinal aperture 112 through which the carrier 103 may operate and across which the shuttles 107 travel, and which will hereinafter be referred to as the throat of the machine. The bed of the machine 108 is also provided with an inclined front 113, upon which are mounted a plurality of spindles 114 for receiving spools 115 containing the warp threads, as A, A', and, as shown, the bed of the machine is longitudinally extended by a framework, generally designated 116, adapted to support a driving shaft 117, and a portion of the operating mechanism of the machine.

The fabric produced by the machine and formed, as already described, by the successive production of rows of knots, 101, 102, at the throat of the machine between warp threads A, A', delivered from the spools 115, and weft threads B, B', delivered from the shuttles 107, is led over suitable take-up rolls 118, 119, to a drum 120 near the top of the machine and against which it is held in frictional contact by means of a guide-roller 121, and then passes over a further roller 122, as shown, journaled in bracket-arms 123, to permit the finished article to overhang the back of the machine, where it is deposited in a suitable receptacle, not shown.

The take-up rolls 118 and 119, and the drum 120, are intermittently driven to advance the fabric between each row of knots produced at the throat of the machine, the size of the mesh which is formed being determined by the distance which the fabric is advanced at each movement of the drum 120. For turning the drum there is rigidly mounted on the end of the drum-shaft 124 a ratchet-wheel 125, most clearly shown in Figs. 1 and 2, and coöperating with this ratchet-wheel is a pawl-arm 126, formed upon a gear-wheel 127, loosely mounted on the drum-shaft 124 adjacent the ratchet-wheel. A plurality of spring-pawls 128, pivotally mounted in the upright 109 of the frame of the machine, engage the ratchet-wheel 125 to prevent a counter-rotation of the drum 120. The gear wheel 127 is rotated to swing the pawl-arm 126 by means of a gear-rack 129, having an intermittent reciprocating movement. This gear-rack is most clearly shown in Fig. 10; it slides in suitable ways 130, formed on the end frame 109 of the machine, and, as shown, has formed on its back a lug 131, through which it is connected by means of a link 132 to a swinging arm 133, Fig. 9, pivotally attached to the frame of the machine near its base at 134.

A spring 135 reacts upon the under face of the arm 133 with sufficient force to normally hold the gear-rack 129 in a raised position, the lug 131 being then in contact with a stop 136 limiting its upward movement. The arm 133 is depressed against the effort of the spring 135 by means of a cam 137, rigidly secured to the driving shaft 117, and engaging a roller 138 carried by the arm. The stop 136 is adjustably secured to the frame of the machine, being preferably provided with a threaded stem 139 which projects through a slotted aperture 140 in the upright 109, and carries a clamping nut, shown as taking the form of a hand-wheel 141. As the stop 136 limits the upward movement of the gear-rack 129 and through it the swinging pawl-arm 126, the size of the meshes formed in the net produced by the machine is directly controlled by its position, and preferably there is formed on the side of the machine adjacent the stop a ruled scale 142, graduated to indicate the correct position of the stop for the sizes of mesh most commonly used, as shown in Fig. 9.

The proper amount of warp thread for each mesh is delivered to the knot-forming mechanism of the machine to be taken up by the next advance of the take-up apparatus just described, by means of a take-out device, most clearly shown in Figs. 16, 17 and 18. This device is located on the front of the machine immediately below the table 111 and just above the spool rack 113. It comprises a bar 143, rigidly fixed in position on the frame of the machine, being preferably secured to two standards 144 and 145, which support the spool rack, by means of screws 146. As shown, it is provided with a plurality of apertures 147, one for each warp thread, and takes the form commonly termed a comb. Coöperating with this bar or fixed comb 143 to draw out the warp threads from the spools 115, is a movable comb 148, as shown taking the form of a bar having a longitudinal movement on the frame of the machine, and a plurality of apertures 149 for receiving the threads. The comb 148 is moved in one direction (to the right as viewed in Fig. 18), by the drawing up of the warp threads by the take-up apparatus previously described, there being sufficient friction of the spools 115 on their spindles 114 to prevent the paying out of thread from the spools when the take-up apparatus is in operation.

The distance through which the movable comb 148 is shifted to the right at each movement is determined wholly by the extent of movement of the take-up apparatus, and after each of such movements it is returned to its normal position by means of a cam 150, formed on the driving shaft 117. This cam reacts upon the cam roller 151 of a swinging arm 152, pivoted to the frame of the machine near its base at 153, and having its free end connected, by means of a link 155 to a cross-head 154 to which the movable comb 148 is rigidly secured. The action of the cam 150 is supplemented by means of a weight 156, connected to the movable comb by means of a cord 157, turning over a pulley 158 journaled in the frame of the machine. By means of this weight the warp threads A, A', are held taut when the cam 150 is out of operation.

In order to insure that thread may be drawn from the spools 115 when the movable comb 148 is moved by the cam 150, and not returned from the knot-forming mechanism, each of the warp threads A, A', after passing through the corresponding aperture 149 of the movable comb, passes through a thread lock 159 adapted to permit the passage of the thread in one direction only. As shown, this device takes the form of a metal loop pivotally secured at 161 to a plate 160, mounted on the front of the machine. Each loop 159 has an eye 162, through which the thread passes, and a shoulder 163 which, with a pin 161$^a$, forms a jaw for gripping the thread when pressure is applied to the eye 162 to the left as viewed in Fig. 18.

The knot-forming mechanism of the machine comprises a carrier bar 103, having a plurality of eyes 200 for receiving the warp threads A, A'. This carrier bar has a complex longitudinal and vertical reciprocating movement for the purpose of wrapping the warp threads about the looping pins 104 and 105 to form a loop, as indicated in Figs. 39 and 40, through which the shuttle 107 passes its weft thread to produce a knot.

The carrier bar 103 is connected by links 201 to a plurality of vertically movable cross-heads 202, each mounted on a vertical slide-rod 203 rigidly secured to the base of the machine, as indicated at 204, Fig. 4. As shown, movement is simultaneously imparted to each of the cross-heads 202 to vertically reciprocate the carrier-bar 103 by means of a plurality of bell-crank levers 205, each pivotally attached to the frame of the machine at 206, and having one of its arms connected to one of the cross-heads 202 by means of a link 207. The other arm of each of the bell-cranks is connected by a swivel 208 to a rod 209, leading from a swinging arm 210 hung from a transverse shaft 211 mounted in the longitudinally extended portion of the frame 116. At the free end of the arm 210 there is provided a cam-engaging roller 212, which runs in the track of a two-wing cam 213 fixed in position on the driving shaft 117.

The links 201 connecting the carrier-bar 103 to the cross-head 202 permit the former to have an independent longitudinal reciprocating movement, and this movement is controlled by means of a pattern wheel 214. This pattern wheel preferably rotates at a less rate than the driving shaft 117, which, as shown, makes one complete revolution for each row of knots produced in the fabric, while the pattern wheel makes but one revolution for each two rows of knots produced, thereby providing a simple arrangement of parts for forming a different loop in each of the warp threads for each alternate row of knots. As shown, the pattern wheel 214 is loosely mounted on the transverse shaft 211 and has gear connection with a pinion 215 carried by the driving shaft 117. It is provided with a cam track 216 for swinging a bell-crank lever 217 pivotally attached to the frame of the machine at 218, and having upon one of its arms a cam roller 219 which rides in the cam track of the pattern wheel. The other arm of the bell-crank lever 217 is operatively connected with the carrier bar 103 in such a way that the bar may be longitudinally reciprocated by the swinging of the lever independently of its vertical movement. As shown a vertical slideway 220 is formed in the carrier bar 103 adjacent one of its ends, and in this slideway there is mounted a gib 221 having a rigid arm 222, which is pivotally attached to the bell-crank lever 217 at 223.

Preferably, though not necessarily, there is mounted on the carrier bar 103 a plurality of loop-guiding hooks 250, most clearly shown in Figs. 28 and 29. Normally one end of each of the hooks overhangs the upper edge of the carrier bar 103 between each pair of thread eyes 200, and the movement of the hooks on the bar is guided by a clip 251, preferably secured to the face of the bar by means of set-screws 252, and having a plurality of recesses 253, one for receiving each of the hooks. A spring 254 connects each of the hooks to a bar 255, rigidly secured to each of the cross-heads 202 by a clamping bolt 256, and rendered vertically adjustable thereon by means of a slotted aperture 257 formed in the cross-head for receiving the clamping bolt. Each of the loop-guiding hooks 250 has an inclined portion 258, preferably adjacent its head, one face of which is adapted to engage a correspondingly inclined shoulder 259, formed on the clip 251 to advance the hook by a cam action whenever it is raised relatively to the carrier bar 103, while the opposite face of the inclined portion of the hook engages the inclined edge 260 of the carrier bar by a cam action to retract the hook whenever it is lowered on the bar.

Preferably, near the foot of each hook 250, there is formed a shoulder 261 which normally engages the flange of a cast-off bar 262, most clearly shown in Fig. 4. The flange of this cast-off bar is slotted, as indicated at 263, to receive each of the hooks. It is fixed against longitudinal movement on the carrier-bar 103 by means of a pin 264 projecting from the face of the cast-off bar into a vertical slideway 265 formed in the carrier-bar, and it has an independent vertical movement to raise and advance the loop-guiding hooks. For this purpose there is pivotally mounted on each of the cross-heads 202 a bell-crank lever 266, each having one of its arms connected to the cast-off bar 262 by a link 267, which is preferably vertically disposed in order that longitudinal movement of the carrier bar and the cast-off bar may not affect the relative vertical position of the latter. The other arm of each of the bell-crank levers is connected by a swivel 268, Fig. 3, to a connecting rod 269, leading from a slide 270, vertically movable in a slideway 271, formed in a swinging arm 272 pivotally secured to the base of the machine at 273.

So long as the swinging arm 272 remains at rest in a substantially vertical position, the slide 270 will move in the slideway 271 whenever the cross-heads 202 are shifted, whereby the cast-off bar 262 is caused to move vertically with the carrier bar 103, while an independent vertical movement may be imparted to the cast-off bar 262 by swinging the arm 272 to turn the bell-crank levers 266. For this purpose there is provided a cam 273, rigidly mounted on the driving shaft 117 adjacent its left end, as viewed in Fig. 2, and a rock-shaft 274, preferably journaled in brackets 275, secured to the inner face of the standard 109 of the frame of the machine, has a pair of relatively inclined arms 276, 277, one of them being provided with a cam roller 278 for engaging the cam 273, and the other connected by a link 279 to the swinging arm 272.

Preferably, the vertically movable parts just described, including the carrier bar 103, the cast-off bar 262, and the cross-heads 202, and their appurtenances, are counterweighted by means of a pair of weights 280, each connected to one of the cross-heads 202 by a chain 281 which passes over guide-pulleys 282, journaled on the under side of the table 111.

Preliminary to the formation of a knot between each of the warp threads A, A', and the weft threads B, B', each of the warp threads is passed around the two looping pins 104, 105, which in the machine as illustrated are spaced apart vertically for a sufficient distance to provide space between them for the passage of the shuttles 107 carrying the weft threads B, B'. As shown, the pins 104 project in a row from the face of a laterally and longitudinally movable plate 300, set into the face of the table 111 of the machine adjacent the throat 112. This plate is most clearly shown in Fig. 14, and its position in the machine is illustrated in Figs. 3 and 12.

Each of the pins 104 is provided with a diagonal channel 301, formed in its under face to receive the warp thread as it is passed around the pin, and has its upper face inclined downwardly adjacent its point, as indicated at 302. Preferably a larger number by one of pins is provided than the number of warp threads used on the machine, each of the warp threads being wrapped alternately about each of two adjacent pins, the pins at each end of the machine being, therefore, in operation only during the formation of each alternate knot.

The pins 105 project in a row from the face of a bar 303 extending over the table 111 of the machine for its entire length just above the throat 112 and over the row of shuttles 107. The bar 303 is movably supported by a plate 304 with which it has a sliding engagement, and which is rigidly secured to the frame of the machine. Each of the pins 105 has a pointed end in order to facilitate its withdrawal from the knots formed thereon, and resembles, therefore, the common sewing needle. Provision is made for longitudinally shifting the bar 303 to cause the pins 105 to coöperate with the thread carrier 103 in the formation of the loops of warp thread previously described, and for laterally moving the bar 303 to withdraw the pins from the loop field after each row of knots has been completed.

For longitudinally moving the bar, there is provided a bell-crank lever 305, Fig. 26, pivotally attached to the frame of the machine at 306, and having one of its arms connected to the bar by means of a link 307, which is joined to the bar by a vertical pivot-bolt 308, and to the bell-crank lever by a pin 309 fitting loosely in the end of the lever, in order that the bar 303 may have a slight amount of lateral movement without straining those connections. At the end of the other arm of the bell-crank lever 305 there is provided a cam-engaging roller 310, which rides in a cam track 311 formed, as shown, on the back of the pattern wheel 214. For laterally moving the needle bar 303, there is provided a plurality of horizontally-disposed bell-crank levers 312, each pivotally attached to the frame of the machine at 313 and having one of its arms connected to the needle bar by a link 314, which preferably, when in its normal position, is perpendicular to the bar in order that the longitudinal movement of the bar will not affect its lateral position. The other arm of each of the bell-crank levers 312 is connected by a swivel 315 to a connecting rod 316, extending along the back of the machine for its full length, and joined near one of its ends by a link 317 to one of the arms of a bell-crank lever 318, pivotally attached by a bracket 319 to the frame of the machine. The bell-crank lever 318 is adapted to be swung to shift the connecting rod 316 by means of a cam 320, mounted on the driving shaft 117, being preferably formed integral with the cam 273 provided for imparting independent vertical motion to the cast-off bar 255 of the thread carrier 103.

Preferably, provision is made for separating the two vertical strands of each loop of the warp threads formed on the looping pins 104, 105, to permit the passage of the shuttle 107 through the loop. As shown, one strand of the loop designated a in Figs. 39 and 40, lies somewhat back of the other strand, owing to the diagonal disposition of the channel 301 formed in the under face of the pins 104 (Fig. 14). This strand of each loop is grasped by a catch 106, and there is then a relative longitudinal movement between the pins 104 and the catches 106. Each of the catches 106 comprises a two-part hook, each part of the hook being formed on one of two relatively movable sliding plates 321, 322, most clearly shown in Fig. 13, the position of these plates in the machine being just above the pin-bar 300, as shown in Fig. 3. Relative movement is given to the plates 321, 322, to open and close the catch hooks 106, by means of a pair of toggle links 323, 324, pivotally united at 325 and each connected to one of the plates, as indicated at 326, 327. For swinging these toggle links their pivotal connection 325 is connected by a link 328 to one arm of a bell-crank lever 329, pivotally attached to the frame of the machine at 330, Fig. 7, and operated by means of a cam 331 formed on the driving shaft 117, and preferably integral with the pinion 215. In order that the longitudinal and lateral movement of the plates 321, 322, may not interfere with their relative position by swinging the toggle links 323, 324, the link 328 preferably normally occupies a substantially vertical position, and is of considerable length, so that a slight longitudinal movement of its upper end does not give it sufficient inclination to effect the height of that end while its connections with the bell crank lever 329 and with the toggle links have a sufficiently loose fit to permit a slight lateral movement of the two plates.

Relative longitudinal movement between the catch hooks 106 and the looping pins 104, for the purpose of opening out the loops for the passage of the shuttle, as previously described, is preferably effected by means of a horizontally disposed swinging lever 332 (Fig. 12) pivotally attached to the frame of the machine at 333, and connected, at one side of its pivot, to the pin bar 300 by a link 334 and at the opposite side of its pivot to the plate 322 by means of a link 335. The pivotal connections between the links 334 and 335 and the pin bar 300 and plate 322, respectively, are preferably vertically disposed in order that there may also be a slight lateral movement of the pin bar and the plate. The lever 332 is connected by a short link 336 (Fig. 8) to one arm of a bell crank lever 337, pivotally attached to the frame of the machine at 338 and operated by means of a cam 339, rigidly mounted on the driving shaft 117, and engaging a cam roller 340 carried by the bell crank. As shown, the cam 339 is formed integral with the cam 273, previously described, for imparting vertical movement to the cast-off bar 255 and with the cam 320 provided for laterally moving the needle bar 303.

Lateral movement is imparted to the pin bar 300 and to the plates 321, 322 for the purpose of moving the looping pins 104 and the catch hooks 106 into and out of operative position in the throat of the machine by means of a cam bar 341 (Figs. 3 and 12) embedded in the table 111 and having a longitudinal sliding movement therein. Cam slots 342 and 343 are formed in the bar 341 for engaging rollers 344 and 345 carried by the pin bar 300 and one of the plates 321, 322, respectively, the latter being preferably mounted upon an angular lateral extension 346 of the plate 322. The cam bar 341 is connected by a link 347 to one arm of a bell crank lever 348 (Fig. 5) pivotally attached to the frame of the machine at 349 and having upon the end of its other arm a cam roller which engages a cam 349$^a$ mounted on the driving shaft 117.

Each of the shuttles 107 is adapted to travel across the table 111 of the machine and return to its normal position, illustrated in Fig. 3, to pass the weft thread B carried by its bobbin 350 through the loop of warp thread formed on the pins 104, 105, and, as shown, has a T-slot 351, Fig. 21, formed on its under face and adapted to engage either one of two T-rails 352, 353, mounted in a transverse position on the table of the machine and having their ends in register on opposite sides of the throat 112, in order that the shuttle may pass from one to the other. Each shuttle 107 is driven on these rails across the throat by means of a pair of pinions 354, 355, journaled in the table 111, one at each side of the throat of the machine, but preferably spaced apart a less distance than the length of the base of the shuttle. Each pinion has a portion of its face projecting through the head of one of the rails 352, 353, to engage a gear-rack 356 formed on the base of the shuttle, as shown, within the T-slot 351. The pinions 354, 355, for all of the shuttles are mounted on shafts 357, 358, housed within the table 111 and preferably extending the entire length of the machine. As shown, each of these shafts has one of its ends projecting through the standard 109, as indicated at 359, 360, Fig. 12, and is there provided with a driving pinion 361. The two driving shafts 357, 358, are operatively connected to turn together preferably by means of an idle gear 362, rotatively attached to the frame of the machine at 363 and meshing with both driving pinions 361.

A reciprocable gear-rack 364 is provided to simultaneously drive the two shafts 357, 358, alternately in opposite directions, in order to advance and return the shuttles 107, and, as shown, this rack meshes with one of the pinions 361. It has a sliding bearing in the frame of the machine, as most clearly shown in Fig. 12, and is adapted to be intermittently reciprocated by means of a swinging arm 365, pivotally attached to the frame of the machine near its base at 366, and connected by a link 367 to a lug 368 formed on the gear-rack and projecting through a slot 369 (Fig. 2) provided in the front wall of the rack housing. A cam 370 is provided for swinging the arm 365, and, as shown, is rigidly mounted on the driving shaft 117.

Each of the shuttles 107 takes the form of an elongated housing for a bobbin 350 and for thread tensioning and take-up mechanism, most clearly shown in Fig. 19. The lower wall of the shuttle is suitably curved, as shown at 371, to provide a seat for the periphery of the bobbin, and preferably adjacent this seat an aperture 372 is formed for receiving a quantity of absorbent material, which may be moistened with oil through a lateral opening 373, for the purpose of lubricating the seat. The side walls of the shuttle are extended upwardly, as indicated at 374, to support the bobbin, and most conveniently these extensions are formed of sheet metal in order that the outside dimensions of the shuttle may be as small as possible. A tensioning finger 375 is pivotally attached to the shuttle walls above the bobbin at 376, and is yieldingly advanced by a spring 37 coiled about its pivot to frictionally engage the thread wound on the bobbin to retard its rotation when the thread is drawn out. One end of this spring 377 reacts upon and supports a thread loop 378, rotatably mounted on the pivot 376 which carries the finger 375 and having an eye 379 through which the thread B may pass as it runs from the bobbin. A shoulder 380 is formed on the loop 378 and forms with a stop-pin 381, secured to the walls of the shuttle, a grip for preventing the paying out of thread when it is overturned on the loop, as indicated by dotted lines in Fig. 19.

Preferably a spring-controlled take-up device is provided on each shuttle for controlling the slack thread whenever the shuttle is operated. As shown, this takes the form of a yoke 382 pivotally attached to the walls of the shuttle at 383 and bearing on the thread at its outer end, as indicated at 384. This yoke is normally drawn toward the dotted lines position of Fig. 19 by a spring 385, which reacts between the floor of the shuttle and the yoke through a link 386. A pin 387 is attached to the walls of the shuttle for the purpose of guiding the thread to the loop 378, and as shown is so disposed that it also serves to frictionally engage a projecting inner end 388 of the tensioning finger 375 to support it in the raised position, shown by dotted lines in Fig. 19. To this position, the finger will necessarily be shifted by manually withdrawing the bobbin from the shuttle when its thread has been exhausted and it is important that the finger should then be supported, as shown, to facilitate the insertion of a fresh bobbin.

Should the tensioning finger become displaced from its support when there is no bobbin in the shuttle, its downward movement is limited, in order that its outer end may still be accessible to raise it, by a stop 389 provided for engaging its inner end 388, and shown as taking the form of a depression in the wall of the shuttle. In order that tension produced upon the weft thread by the tensioning finger 375, may be substantially uniform whether the bobbins are completely filled with thread or nearly exhausted, the spring 377 is so coiled that its expansive force is more nearly spent when but few turns of thread remain on the bobbin and the latter must, therefore, revolve more rapidly to pay out thread at a given rate than when the bobbin is full.

Preferably all of the shuttles 107 are fixed against longitudinal movement on the table 111 of the machine, and the weft thread which each carries is knotted alternately with each of two adjacent warp threads by forming the loops previously described, in each warp thread alternately in front of each of two adjacent shuttles. As one end of that portion of each warp thread from which the loop is made is carried by the carrier 103, its position along the machine is determined by the longitudinal position of the carrier, which in turn is controlled by the pattern wheel 214. The other end of that portion of each warp thread from which the loop is made extends to the finished fabric on the take-up rolls 118, 119, and, as shown, is moved along the machine from a position in front of one of the shuttles 107 to a position in front of the next adjacent shuttle by longitudinally shifting these rolls after the formation of each knot.

Most conveniently both of the take up rolls 118, 119, are slidingly journaled in brackets 400 and 401 projecting from a horizontal frame member 402 (Fig. 3) of the machine, and the two rolls are fixed against relative longitudinal movement by means of a flange 403 formed on one of them as 119 and fitting into a groove 404 formed in the other, as shown adjacent its right-hand end, as viewed in Fig. 1. One of the rolls as 118 is extended through the upright frame member 109, as indicated at 405, and is provided near its outer end with a pair of shoulders 406 between which it receives the slotted end of a bell-crank lever 407, pivotally attached to the frame of the machine at 408.

Means are provided for intermittently swinging the bell-crank lever 407 to longitudinally shift the take-up rolls 118, 119, and as shown this takes the form of a cam-track 409 formed on the pattern wheel 214, and in which runs a cam roller 410 carried by the bell-crank. To insure the fabric being shifted with the take-up rolls, the surface of one of them, as 118, is roughened, preferably by having formed thereon a plurality of circumferential grooves 411. As shown, the roll 119 is provided with a gear 412 which meshes with a gear 413 formed on the drum 120, and has a sufficiently broad face to permit of the relative longitudinal movement between the roll and the drum without disturbing the gear connection. Rotative movement is imparted from the roll 119 to the grooved roll 118, through gearing 414, and both rolls therefore are intermittently driven to advance the fabric through the drum 120 by the ratchet and pawl mechanism 125, 126, previously described.

Tensioning mechanism is provided for straining the warp threads A, A', to draw up the knot loops, Figs. 39 and 40, after the weft threads B, B', have been passed through the loops to form a knot, and as the machine preferably forms a large number of knots simultaneously in a row, one knot being formed in each of the warp threads, great power is required to insure all of the knots being drawn taut. As shown, provision is made for supplementing the power obtained from the revolving parts of the machine for operating the tensioning mechanism by means of a power cylinder illustrated in detail in Fig. 5, and adapted to be operated by a compressed fluid.

Preferably the tensioning mechanism acts upon the warp threads A, A', between the take-out mechanism illustrated in Figs. 16, 17 and 18, and the thread carrier 103, and is most clearly shown in Figs. 1, 2 and 5. As shown, it comprises a horizontally-disposed bar 425 extending for substantially the entire length of the machine and supported by or "floating upon" the warp threads A, A'. It is guided by a plurality of vertically-elongated loops 426 (Fig. 1) with each of which it has a rotative engagement through a flanged bushing, 427 (Fig. 41), having frictionless rollers 428. The loops 426 are mounted upon a vertically movable plate 426$^a$, carried by cross-head 429, each having a sliding engagement with a slideway 430 formed on the frame of the machine. Each cross-head 429 is connected by a link 431 to one arm of a swinging lever 432, pivotally attached to the frame of the machine at 433, and preferably so formed as to have great strength. A connecting rod 435 is joined by a swivel 434 to each of the levers 432, and is united by a link 439 to a cam lever 436, pivotally hung from the shaft 211, and having at its free end a cam-engaging roller 437 which rides upon a cam 438 (shown in Figs. 1 and 5) mounted on the driving shaft 117, and preferably formed integral with the cam 370 provided for reciprocating the shuttles 107. Preferably the link 439 is adjustably united to the lever 436 by means of a clamping bolt 464 passing through a slot 465 (Fig.

42) in the lever, and is connected by a pitman 440 to the piston-rod 441 of a power cylinder 442 mounted in an A-frame 443 bolted to the frame of the machine at 444 and 445. An adjustable stop is provided for limiting the outward travel of the piston 446 within the power cylinder 442 and, as shown, takes the form of a bolt 447 having a threaded engagement with the outer head of the cylinder and adapted to be secured in any adjusted position by a lock-nut 448.

A threaded nipple 449 is formed upon the wall of the power cylinder 442 for the connection of a suitable source of power fluid, not shown, and for the exhaust of fluid from the cylinder. As shown, a rotary valve 450 is mounted in the nipple 449 for controlling the admission and exhaust of power fluid and this valve is operated by a cam 451 mounted on the driving shaft 117 and preferably formed integral with the cam 349ª provided for controlling the lateral movement of the looping pins 104 and of the catch hooks 106. A valve-rod 452 connects a crank arm 453 formed on the stem of the valve 450 to a cam-lever 454 hung from the shaft 211 and provided at its free end with a roller for engaging the cam 451.

In order to insure that thread will not be drawn from the spools 115 or from the take-out mechanism illustrated in Fig. 18, by the operation of the tensioning device just described, an additional thread lock 455 (Fig. 17) is provided for gripping the thread when the tensioning bar 425 is drawn down. Preferably this takes the form of a loop through which the thread passes, and as shown is pivotally attached to the front plate 160 at 456 in such a position that it overhangs the upper edge of this plate. The loop 455 is provided with a shoulder 457 which, with the upper edge of the plate 160 forms a jaw for gripping the thread when its outer end is depressed by the downward strain of the tensioning device.

The operation of the machine is as follows:—Power is applied to the driving shaft 117 by means of a belt pulley 460 loosely mounted thereon and having rotative connection with the shaft through a train of speed-reducing gears including a pinion 462 formed on the hub of the belt pulley 460, a gear 461 fixed in position on the frame of the machine and having inwardly-directed teeth, and an idler 463 connecting the two and carried by a crank-arm 464 rigidly mounted on the shaft 117. After the completion of each row of knots in the fabric, the take-up rolls 118, 119, and the drums 120 are advanced by the ratchet and pawl mechanism 125, 126, drawing an amount of weft thread from the bobbins 350 carried by the shuttles 107, and of warp thread from the take-out apparatus (Fig. 18) by drawing the movable comb 148 to the right as viewed in that figure, equal to the desired distance to the next row of knots, or to the size of the mesh in terms of the so-called square measure. The distance through which the take-up rolls turn at each advance is determined by the position of the stop 136 on the scale 142, Fig. 9, and between each advance of the take-up rolls the movable comb 148 of the take-out apparatus is returned to its normal position by the cam 150, Fig. 16, drawing from the spools 115 an amount of warp thread equal to that just taken out by the last advance of the take-up rolls. After each advance of the fabric, the looping pins 104, 105, and the catch hooks 106 are advanced into operation by the action of the cam plate 341 (Fig. 12) and the cam 320 (Fig. 25) and each of the warp threads is wound around the two looping pins by the combined vertical and longitudinal movement of the thread carrier 103 to produce loops, Figs. 39 and 40, through which the shuttles 107 may be passed with the weft threads to produce a knot. During this part of the operation, the warp-threads are held taut by the weight of the tensioning bar 425 which may rise and fall within the loops 426 to permit the movement of the carrier without taking additional thread from the spools 115.

In order that each warp thread may be knotted alternately with each of two adjacent weft threads, and that alternate rows of knots may be oppositely drawn, as illustrated in Fig. 38, that portion $x$ (Figs. 30 and 34) of each warp thread extending from the finished fabric on the take-up rolls is passed, by the movement of the carrier 103, to the right, as viewed from the front of the machine alternately beneath each of two adjacent pins 104, and then over, alternately in opposite directions the same looping-pin 105. The pin 105 is then shifted to the right or left by a longitudinal movement of the needle-bar 303 (Fig. 26) to a position directly over that one of the pins 104 around which the same warp thread has just been passed, thus bringing the loop immediately in front of the desired one of the shuttles 107. The catch 106 is now closed upon the strand $a$ of the loop by a shifting of the toggle links 323, 324, Fig. 13, the lower portion of the loop is opened out for the passage of the shuttle by a relative-longitudinal movement between the looping pins 104 and the catch hooks 106, produced by a shifting of the lever 332 (Fig. 12) and the carrier bar 103 is lowered to a position below the plane of the shuttles 107.

The position of the thread at the throat of the machine for alternate rows of knots is now that illustrated in Figs. 30 and 34. The shuttle 107 carrying a weft thread is then advanced through the loop of warp thread by the turning of the pinions 354, 355. After the shuttle has crossed the throat of the machine, the strand $y$ of warp thread is swung to the left by a longitudinal movement of the carrier bar 103, and the shuttle is returned by a counter-rotation of the pinions 354, 355, at the opposite side of the strand of warp thread, thus producing a knot, as illustrated in Figs. 31 and 35. The loop of warp thread is now released by the withdrawal of the catch hooks 106, and lower looping pins 104, and is drawn up by the powerful lowering of the tensioning bar 425 produced by the swinging of the lever-arms 432 by the action of the cam 438 preferably supplemented by the admission of compressed air to the power cylinder 442. To prevent the tangling of the loop as it is drawn taut by the tensioning device, it is preferably guided by the spring controlled loop-guiding hook 250. The point of this hook is brought into the loop just previous to the withdrawal of the looping pins 104 and catch-hooks 106 by the independent raising on the carrier-bar 103 of the cast-off bar 262, which tilts the hook to the dotted lines position of Fig. 28, and by a longitudinal movement of the carrier bar produced by the pattern wheel 214, which moves the hook into the loop from right to left for knots of the form illustrated in Figs. 30 to 33, and from left to right for knots of the form illustrated in Figs. 34 to 37 in order to avoid putting a half turn into the thread.

The loop-guiding hook 250 is raised by the drawing up of the loop, its spring 254 being correspondingly strained, and just before the knot is drawn tight the hook is raised out of the loop by the raising of the carrier bar 103 by one of the wings of the two-wing cam 213 (Fig. 4) and by a further independent raising of the cast-off bar 262. The upper looping pin or needle 105 is then withdrawn from the knot by the lateral movement of the needle-bar produced by the bell-cranks 312 and the cam 320. After the completion of each row of knots, the take up rolls 118, 119 will be longitudinally shifted by the operation of the cam 409, Fig. 1, on the bell-crank lever 407, to shift each warp thread into position in front of the next adjacent shuttle 107 and these rolls and the drum 120 will then be again advanced and the knot forming operation repeated.

If desired the stop 447 for limiting the travel of the piston 446 of the power-cylinder 442 may be so adjusted that the tensioning mechanism will be given a greater movement by the power cylinder than is effected by the cam 438. The cam-engaging roller 437 will then ride off the end of the cam 438 at 466 (Fig. 5), while the elasticity of the warp threads A, A', will insure its being returned, when released by the power cylinder, to a position such that it will be again engaged by the retracting portion of the cam 438 at 467.

By means of the loop-guiding hooks 250 a strain is brought upon the looped portion of the warp threads A, A', while the knot is drawn up by the tensioning mechanism, thus preventing the twist of the thread from being stripped into its looped portion as it passes over the pin 105. In this way the tangling of the loop is avoided and a net is produced which is free from kinks or snarls and which will lie flat and smooth when spread out for use.

I claim as my invention—

1. In a netting machine, the combination with a spool, knot-forming mechanism, and a take-up roll, of a latch located between the spool and the knot-forming mechanism and adapted to permit the passage of thread in one direction only, a reciprocable take-out member adapted to bear on the thread between the latch and the spool, a cam intermittently acting on such member to move it in one direction, and means for intermittently turning the take-up roll.

2. In a netting machine, the combination with a spool, knot-forming mechanism, and a take-up roll, of a latch located between the spool and the knot-forming mechanism and adapted to permit the passage of thread in one direction only, a reciprocable take-out member adapted to bear on the thread between the latch and the spool, a cam intermittently acting on such member to move it in one direction, a weight bearing on such member in the same direction, and means for intermittently turning the take-up roll.

3. In a netting machine, in combination, knotting mechanism, a spool, a reciprocable take-out member retracted by the strain of the knotting mechanism, means for limiting the recession of the reciprocable member, and a cam for advancing the reciprocable member and engageable therewith in any of its positions.

4. In a netting machine, in combination, knotting mechanism, a spool, a reciprocable take-out member retracted by the strain of the knotting mechanism, a cam for advancing the reciprocable member and engageable therewith in any of its positions, and a weight acting on the bar in the same direction as the cam.

5. In a netting machine, in combination, knotting mechanism, a spool, a reciprocable take-out member retracted by the strain of the knotting mechanism, a swinging arm pivoted to a fixed support, a link connecting the arm and the reciprocable member, a movable inclined advancing cam, a cam-engaging roller on the arm in the path of movement of the cam, and a weight bearing forwardly on the reciprocable member.

6. In a netting machine, in combination, thread-delivering mechanism, knotting mechanism, a tensioning bar having its weight supported by the thread in transit between such mechanisms, and means for augmenting the pressure of the bar on the thread.

7. In a netting machine, in combination, thread delivering mechanism, knotting mechanism, a tensioning bar having its weight supported by the thread in transit between such mechanisms, and a cam for bearing downwardly on the bar.

8. In a netting machine, in combination, thread - delivering mechanism, knotting mechanism, a tensioning bar having its weight supported by the thread in transit between such mechanisms, and a fluid motor for bearing downwardly on the bar.

9. In a netting machine, in combination, thread delivering mechanism, knotting mechanism, a tensioning bar having its weight supported by the thread in transit between such mechanisms, a cam, and a fluid motor for bearing downwardly on the bar.

10. In a netting machine, in combination, thread-delivering mechanism, knotting mechanism, a tensioning bar having its weight supported by the thread in transit between such mechanisms, a tensioning bar-actuating member having a vertical slide-way for receiving the bar and limiting its upward movement, and means for vertically reciprocating the last-named member.

11. In a netting machine, in combination, thread-delivering mechanism, knotting mechanism, a tensioning bar having its weight supported by the thread in transit between such mechanisms, a tensioning bar-actuating member having a vertical slide-way for receiving the bar and limiting its upward movement, a power cylinder having a valve for shifting the last-named member, and means actuated from the moving parts of the machine for controlling the valve of the power cylinder.

12. In a netting machine, in combination, thread delivering mechanism, knotting mechanism, a tensioning bar having its weight supported by the thread in transit between such mechanisms, a flanged bushing having a roller bearing surrounding the bar, a tensioning bar-actuating member having a vertical slot for receiving the bushing and limiting its upward movement, and means for vertically reciprocating the last-named member.

13. In a netting machine, in combination, thread delivering mechanism, knotting mechanism, a tensioning bar having its weight supported by the thread in transit between such mechanisms, a fluid motor for bearing downwardly on the bar and having a valve, and means operated by the moving parts of the machine for controlling the motor valve.

14. In a netting machine, in combination, thread - delivering mechanism, knot-forming mechanism, a take-up device, a tensioning device for drawing the knots taut, driving means for all of the said parts and supplemental driving means acting on the tensioning device.

15. In a netting machine, in combination, knot-forming mechanism, means for driving such mechanism, a straining device for drawing the knot taut, and means independent of the first named driving mechanism for actuating the straining device.

16. In a netting machine, the combination with thread-delivering mechanism and take-up mechanism, of knot-forming mechanism delivering to the take-up mechanism and including a movable thread-carrier receiving from the thread-delivering mechanism, means for actuating the knot-forming mechanism including a shaft adapted to make one revolution for each knot produced thereby, a pattern wheel for guiding the thread-carrier, and gear connection between the pattern wheel and the shaft whereby the pattern wheel is revolved at a less rate than the shaft.

17. In a netting machine, the combination with thread-delivering mechanism and take-up mechanism, of knot-forming mechanism delivering to the take-up mechanism and including a movable thread-carrier receiving from the thread-delivering mechanism, a cross-head, a slide-way for the cross-head, a link connecting the thread-carrier and the cross-head, means for reciprocating the cross-head on the slide-way, a pattern wheel, means for turning the pattern wheel, and operative connection between the pattern wheel and the thread carrier whereby movement is imparted to the latter in a direction at an angle to the direction of movement of the cross head on the slide-way.

18. In a netting machine, the combination with thread-delivering mechanism and take-up mechanism, of knot-forming mechanism delivering to the take-up mechanism and including a movable thread-carrier receiving from the thread-delivering mechanism, a cross-head, a slide-way for the cross-head, a link connecting the thread-carrier and the cross-head, means for reciprocating the cross-head on the slide-way, a pattern wheel having a cam track, means for turning the pattern wheel, a cam-block running in the cam track, and operative connection between the cam-block and the thread carrier, such connection having engagement with the thread carrier adapted to slide in the direction of movement of the cross-head.

19. In a netting machine, the combination with thread-delivering mechanism and take-up mechanism, of knot-forming mechanism delivering to the take-up mechanism and including a movable thread-carrier receiving from the thread-delivering mechanism, a cross-head, a slide-way for the cross-head, a link connecting the thread-carrier and the cross-head, means for reciprocating the cross-head on the slide-way, a pattern wheel having a cam track, means for turning the pattern wheel, a bell-crank lever pivotally attached to a fixed support and having one of its arms engaging the cam track of the pattern wheel, and connection between the other arm of the bell-crank and the thread carrier adapted to slide in the direction of movement of the cross-head.

20. In a netting machine, the combination with thread-delivering mechanism and take-up mechanism, of knot-forming mechanism delivering to the take-up mechanism and including a movable thread-carrier receiving from the thread-delivering mechanism, a cross-head, a slide-way for the cross-head, a link connecting the thread-carrier and the cross-head, means for reciprocating the cross-head on the slide-way, a pattern wheel having a cam track, means for turning the pattern wheel, a slide-way formed on the thread carrier in the direction of movement of the cross-head, a gib fitting in the slide-way, and a bell-crank lever pivotally attached to a fixed support, one arm of the bell-crank being in engagement with the cam track of the pattern wheel and the other arm of the bell-crank being pivotally united to the gib.

21. In a netting machine, in combination, means for forming a loop in the warp thread, means for passing a weft thread through the loop, means for drawing the warp thread to tighten the loop around the weft thread, and means for applying tension to the loop while being so drawn, whereby the thread is prevented from snarling and the twist of the thread is not distorted.

22. The combination with knot-forming mechanism comprising a loop-making device and means for drawing up the loop, of a yieldingly supported guide for the loop as it is drawn.

23. The combination with knot-forming mechanism comprising a loop-making device and means for drawing up the loop, of a yieldingly-supported loop-guiding hook, and means for engaging the hook with and for disengaging the hook from the loop.

24. The combination with knot-forming mechanism comprising a loop-making device having a pin and a thread carrier movable about the pin, of a yieldingly-supported loop-guiding hook mounted on the thread carrier, and means for advancing the hook in front of the carrier.

25. The combination with knot-forming mechanism comprising a loop-making device having a pin and a thread carrier movable about the pin, of a yieldingly-supported loop-guiding hook mounted on the thread carrier and having a cam-engaging shoulder, an advancing cam on the thread-carrier, and means for moving the hook against the cam.

26. The combination with knot-forming mechanism comprising a loop-making device having a pin and a thread carrier movable about the pin, of a loop-guiding hook mounted on the thread carrier and having a cam-engaging shoulder, an advancing cam on the thread carrier, a movable cast-off bar mounted on the thread carrier, and a spring for yieldingly holding the hook against the cast-off bar.

27. In a netting machine, in combination, two looping pins, a shuttle movable between the pins, a thread carrier having a vertical and longitudinal movement, a yieldingly-supported loop-guiding hook mounted on the thread carrier, a cast-off bar engaging the hook and movable longitudinally with the thread carrier but having an independent vertical movement, and a straining device for drawing up the loop formed on the pins.

28. In a netting machine, in combination, two looping pins, a shuttle movable between the pins, a thread carrier, a yieldingly-supported loop-guiding hook mounted on the thread carrier, a cast-off bar engaging the hook and fixed against longitudinal movement on the thread carrier, a cross head, a link connecting the cross-head and the thread carrier, a bell-crank pivotally mounted on the cross-head, a link connecting one arm of the bell-crank and the cast-off bar, means for shifting the cross-head, means for independently swinging the bell-crank, means for longitudinally moving the thread carrier, and a straining device for drawing up the loop formed on the pins.

29. In a netting machine, in combination, two looping pins, a shuttle movable between the pins, a thread carrier, a yieldingly-supported loop-guiding hook mounted on the thread carrier, a cast-off bar engaging the hook and fixed against longitudinal movement on the thread carrier, a pattern wheel for longitudinally moving the thread carrier, means for vertically moving the thread carrier, independent means for vertically moving the cast-off bar, and a straining device for drawing up the loop formed on the pins.

30. In a netting machine, in combination, two looping pins, a shuttle movable between the pins, a thread carrier, a yieldingly-supported loop-guiding hook mounted on the thread carrier, a cast-off bar engaging the hook and fixed against longitudinal movement on the thread carrier, a cross-head, a link connecting the cross-head and the thread carrier, a bell crank pivotally mounted on the cross-head, a link connecting one arm of the bell-crank and the cast-off bar, a cam shaft, operative connection between a cam on the shaft and the cross head, operative connection between a different cam on the shaft and the bell-crank, means for longitudinally moving the thread carrier, and a straining device for drawing up the loop formed on the pins.

31. In a netting machine, in combination, two looping pins, a shuttle movable between the pins, a thread carrier, a yieldingly-supported loop-guiding hook mounted on the thread carrier, a cast-off bar engaging the hook and fixed against longitudinal movement on the thread carrier, a cross-head, a link connecting the cross-head and the thread-carrier, a bell crank pivotally mounted on the cross-head, a link connecting one arm of the bell-crank and the cast-off bar, a cam shaft, operative connection between a cam on the shaft and the cross head, operative connection between a different cam on the shaft and the bell-crank, a pattern wheel having a cam track for longitudinally moving the thread carrier, gear connection between the pattern wheel and the cam shaft whereby the pattern wheel is revolved at a less rate than the cam shaft, and a straining device for drawing up the loop formed on the pins.

32. In a netting machine, the combination with thread-delivering mechanism and take-up mechanism, of knot-forming mechanism delivering to the take-up mechanism and comprising a pair of looping-pins, a shuttle movable between the pins, and a thread carrier receiving from the thread-delivering mechanism, a vertically-movable cross-head, a link connecting the cross-head and the thread carrier, means for longitudinally moving the thread carrier, a loop-guiding hook mounted on the thread carrier, a cast-off bar fixed against longitudinal movement on the thread carrier, a spring reacting on the hook and normally holding it in contact with the cast-off bar, a bell-crank lever pivotally mounted on the cross-head, connection between one arm of the bell-crank and the cast-off bar, an arm pivotally secured to a fixed support, connection between the bell-crank and the arm adapted to slide in the direction of movement of the cross-head, and means for swinging the arm.

33. In a netting machine, the combination with thread delivering mechanism and take-up mechanism, of knot-forming mechanism delivering to the take-up mechanism and including a looping device comprising a pin and a thread carrier receiving from the thread-delivering mechanism and movable about the pin, a yieldingly supported loop-guiding hook, and means for advancing the hook into the plane of the knot-forming mechanism.

34. The combination with a shuttle frame, of a bobbin fitting within the frame, a follower adapted to bear on the thread carried by the bobbin, and a spring-closed grip for engaging the thread delivered by the bobbin, the spring of the grip being controlled by the follower and being weakened as the follower approaches the core of the bobbin.

35. The combination with a shuttle frame, of a bobbin fitting within the frame, a finger pivotally attached to the frame, its free end being adapted to bear downwardly on the thread carried by the bobbin, a thread grip comprising a stop fixed in position on the shuttle frame and a member pivoted coaxially with the finger and movable upwardly against the stop, and a spring reacting between the finger and the movable member of the grip to separate them.

36. The combination with a shuttle frame having a curved seat for a bobbin, of a spring-advanced tensioning finger pivotally attached to the shuttle frame over the seat, a stop limiting the downward movement of the finger, and a catch adapted to support the finger in a raised position.

37. The combination with a shuttle frame having a bobbin seat, of a tensioning finger pivotally attached to the frame over the seat, a thread loop pivotally attached to the frame and having a thread-gripping shoulder, a stop coöperating with the shoulder to grip the thread passing through the loop, and a spring reacting between the thread loop and the tensioning finger.

38. The combination with a shuttle frame having a bobbin seat, of a tensioning finger and a thread loop having a thread-gripping shoulder attached by a common pivot pin to the shuttle frame over the seat, a spring coiled about the pivot and reacting between the tensioning finger and the thread loop, and a stop coöperating with the shoulder of the loop to grip the thread passing through the loop.

39. The combination with a reciprocable shuttle frame, of a tensioning device for frictionally engaging the thread delivered by the shuttle, and means for increasing the frictional grip of the tensioning device on the thread as the shuttle frame advances.

40. The combination with a shuttle frame having a thread loop for guiding the thread delivered by the shuttle, of a movable take-up arm adapted to bear on the thread, and a spring acting on the arm to move its free end away from the loop.

41. A non-rotatable looping pin for netting machines having an inclined thread-engaging shoulder whereby the two sides of a loop formed about the pin are caused to lie in a plane which is inclined to the axis of the pin.

42. A non-rotatable looping pin for netting machines having an inclined thread-receiving channel whereby the two sides of a loop formed about the pin are caused to lie in a plane which is inclined to the axis of the pin.

43. In a netting machine having a bed and a throat, in combination, mechanism for delivering thread to the throat, knot-forming mechanism located adjacent the throat and comprising a looping pin projecting into the throat, a bar supporting the pin, a cam-engaging member carried by the bar, a slide mounted in the bed and having an inclined cam-slot for receiving the cam-engaging member of the bar, and means for longitudinally reciprocating the slide.

44. In a netting machine, in combination, knot-forming mechanism, a straining device for drawing the knot taut, a cam for actuating the straining device, and a fluid motor supplementing the cam.

45. In a netting machine, in combination, thread-delivering mechanism, take-up mechanism, knot-forming mechanism delivering to the take-up mechanism including means receiving from the thread-delivering mechanism for forming a loop, a controlling-hook engageable with the loop, means for actuating the knot-forming mechanism, and a pattern wheel for guiding the hook.

46. In a netting machine, in combination, thread-delivering mechanism, take-up mechanism, knot-forming mechanism delivering to the take-up mechanism including a pair of looping pins, a thread-carrier receiving from the thread-delivering mechanism movable about the pins to form a loop and a controlling hook engageable with the loop, means for driving the thread-carrier and the hook, and a pattern wheel for guiding the thread-carrier and the hook.

47. In a netting machine, in combination, thread-delivering mechanism, take-up mechanism, knot-forming mechanism delivering to the take-up mechanism including a pair of looping pins, a thread-carrier receiving from the thread-delivering mechanism, movable about the pins to form a loop and a controlling hook engageable with the loop, means for driving the thread-carrier and the hook adapted to make one revolution for each knot produced, a pattern wheel for guiding the thread-carrier and the hook, and gear connection between the pattern wheel and the said shaft whereby the pattern wheel is revolved at a less rate than the shaft.

48. In a netting machine, in combination, thread-delivering mechanism, take-up mechanism, knot-forming mechanism delivering to the take-up mechanism including means receiving from the thread-delivering mechanism for forming a loop, a controlling-hook engageable with the loop, means for actuating the knot-forming mechanism including a shaft adapted to make one revolution for each knot produced, a pattern wheel for guiding the hook, and gear connection between the pattern wheel and the said shaft whereby the pattern wheel is revolved at a less rate than the shaft.

49. A net making machine comprising thread carrying means, knot tying means, a preliminary work taking up mechanism, a final take up mechanism, and means for operating said take up mechanisms in sequence.

50. A net making machine comprising thread carrying means, knot tying means, a preliminary take up mechanism for taking up the work during the completion of the knot for a fixed distance, and a final take up mechanism adapted to act after the completion of a row of knots to determine the distance between rows of knots, said final take up mechanism being adjustable.

RICHARD F. DANIELS.

Witnesses:
CHARLES B. GILLSON,
LOUIS K. GILLSON.